United States Patent [19]
Kinugasa et al.

[11] Patent Number: 4,781,569
[45] Date of Patent: Nov. 1, 1988

[54] APPARATUS FOR MANUFACTURING EMBOSSED ARTICLES OF SYNTHETIC RESIN

[75] Inventors: Toshiyuki Kinugasa; Tamio Furuya, both of Hidaka; Yoshiki Ishige, Tokorozawa; Nobuo Kikuchi, Sakado; Shoji Takahashi, Iruma, all of Japan

[73] Assignee: Honda Giken Kogyo Kabushiki Kaisha, Tokyo, Japan

[21] Appl. No.: 920,077

[22] Filed: Oct. 16, 1986

Related U.S. Application Data
[62] Division of Ser. No. 787,773, Oct. 15, 1985.

[30] Foreign Application Priority Data

Oct. 18, 1984 [JP] Japan ................. 59-219174
May 27, 1985 [JP] Japan ................. 60-11383

[51] Int. Cl.⁴ ........................................ B29C 51/10
[52] U.S. Cl. ................................. 425/504; 156/245; 156/285; 204/281; 249/55; 249/113; 249/135; 249/141; 264/571; 425/388; 425/DIG. 30
[58] Field of Search .......... 264/293, 510, 512, 321, 264/338, 547, 549, DIG. 60, 87, 220, 571; 204/11, 281; 156/285, 245, 500; 425/387.1, 95, 388, 504, 517, 416, 422, 423, 405 R, 405 H, 437, 470, 85, DIG. 30; 249/55, 61, 62, 80, 113, 134, 135, 141

[56] References Cited

U.S. PATENT DOCUMENTS

| | | | |
|---|---|---|---|
| 2,670,501 | 3/1954 | Michiels | 264/547 X |
| 3,001,582 | 9/1961 | Kindseth et al. | 249/134 |
| 3,216,074 | 11/1965 | Harrison | 249/135 X |
| 3,353,219 | 11/1967 | Snyder | 249/141 X |
| 3,434,182 | 3/1969 | Peterson | 425/470 |
| 3,640,666 | 2/1972 | Jope et al. | 425/388 X |
| 3,811,175 | 5/1974 | Garner et al. | 249/80 X |
| 3,817,806 | 6/1974 | Anderson et al. | 264/512 X |
| 4,057,382 | 11/1977 | Yamamori | 425/387.1 |
| 4,063,705 | 12/1977 | Vodra | 249/80 |
| 4,116,736 | 9/1978 | Sanson et al. | 264/512 X |
| 4,192,701 | 3/1980 | Martin et al. | 264/545 X |
| 4,555,380 | 11/1985 | Munakata et al. | 264/510 |
| 4,555,381 | 11/1985 | Chazal et al. | 264/512 X |
| 4,592,718 | 6/1986 | Teraoka | 425/504 |

Primary Examiner—Richard L. Chiesa
Attorney, Agent, or Firm—Roberts, Spiecens & Cohen

[57] ABSTRACT

An apparatus for manufacturing an embossed article of synthetic resin comprising heating a synthetic resin sheet to a softening temperature; overlaying the heated synthetic resin sheet on an embossing die made by an electro-chemical molding process and having an embossing surface with an embossing pattern thereon and a multitude of fine vacuum pores distributed uniformly over the entire embossing surface; and forcing the synthetic resin sheet against the embossing surface by applying suction through the fine vacuum pores to imprint the embossing pattern onto the synthetic resin sheet.

11 Claims, 9 Drawing Sheets

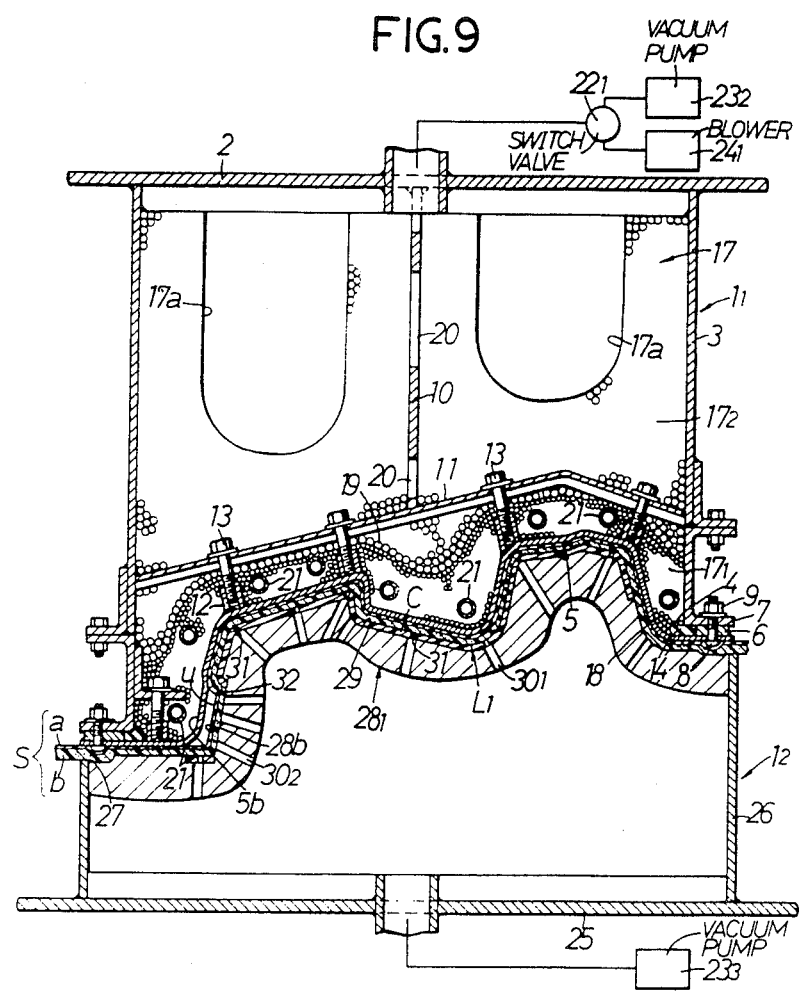

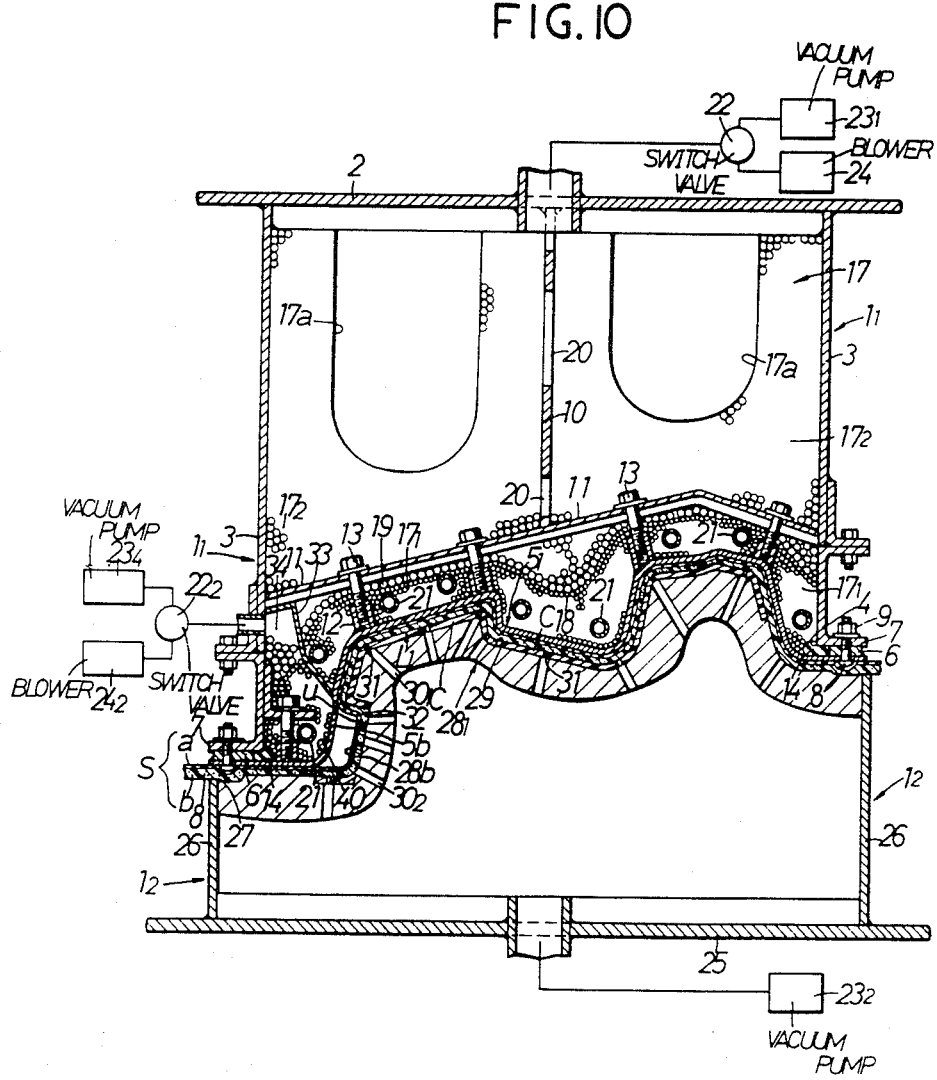

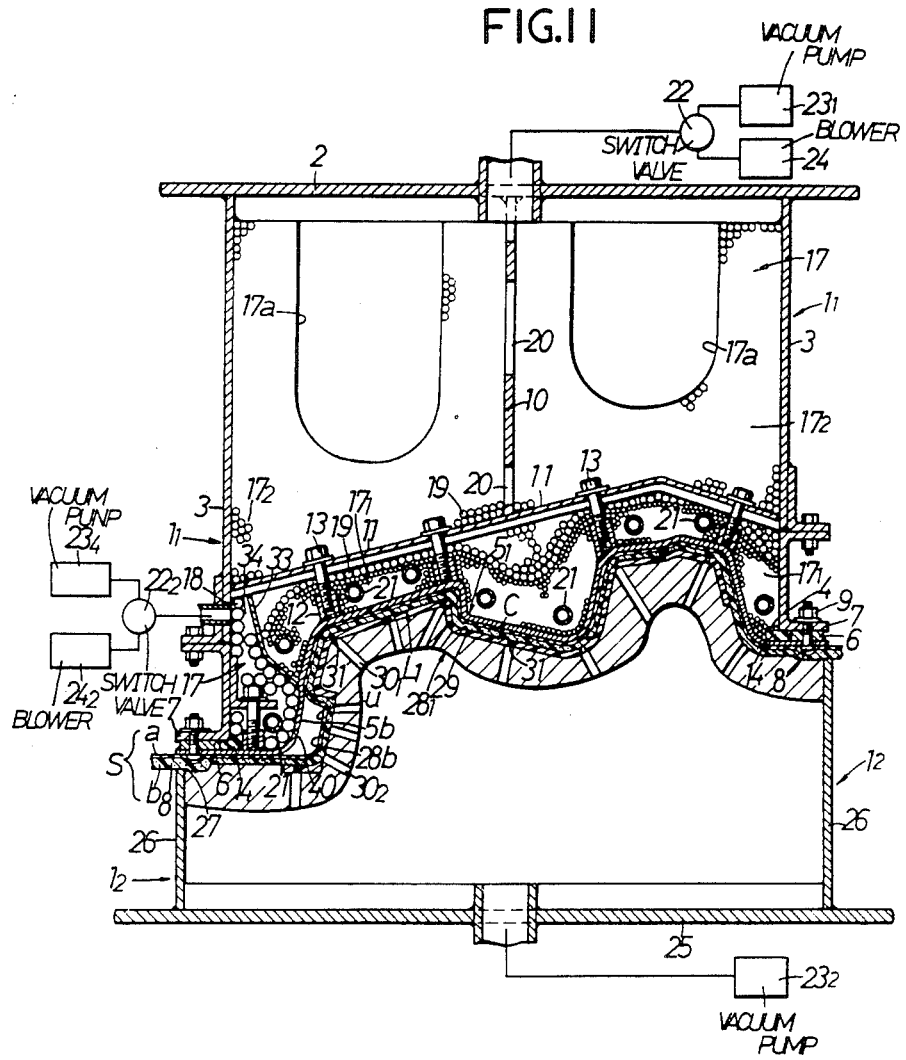

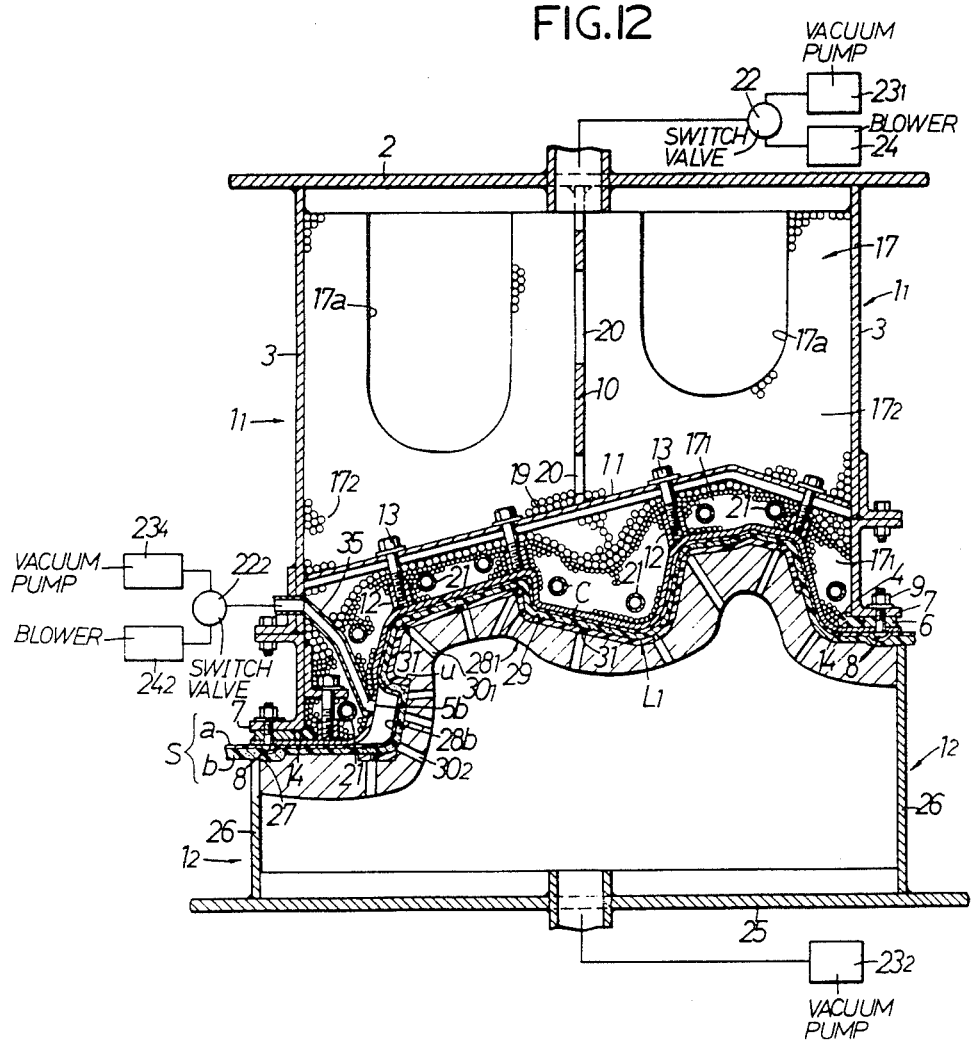

APPARATUS FOR MANUFACTURING EMBOSSED ARTICLES OF SYNTHETIC RESIN

This is a divisional on application Ser. No. 787,773, filed 10/15/85.

FIELD OF THE INVENTION

The present invention relates to apparatus for manufacturing embossed materials of synthetic resins.

PRIOR ART

In the manufacture of sheet materials of synthetic resin having an embossed surface, it is a conventional and common practice to use an engraved roll or plate as an embossing die to press it against the surface of a heated sheet of synthetic resin.

However, while such conventional methods enable an embossing pattern to be clearly imprinted onto the surface of a sheet of synthetic resin, the patterns are limited to relatively simple continuous patterns because such embossing patterns have resulted from the etching of a roll or plate.

It is therefore impossible in the conventional methods to precisely emboss, on the surface of a sheet of synthetic resin, embossing patterns such as the skin patterns of cowhide or the like, grains of woods, and complex patterns found in natural materials including leaves.

When making a material of synthetic resin consisting of a synthetic resin sheet and a core material and having an embossed pattern on its surface, the synthetic resin sheet, having an embossed pattern previously made thereon, is heated and softened, a core material is placed on one of a pair of press dies with its adhesive-coated surface facing outwardly, and the synthetic resin sheet is then placed on the core material and forcedly bonded to it by both the pressing dies.

In the above conventional method, however, if the synthetic resin sheet is stretched by opening edges of the fitted or mated portions of both the pressing dies, the embossed pattern on the stretched portion may be run and be shaded off, which is disadvantageous.

Furthermore, in order to produce an article of synthetic resin from a sheet of synthetic resin including an end wall, side walls connected to the end wall and an undercut connected to the side wall and having an embossed pattern at least on the end and side walls, a synthetic resin sheet having an embossed pattern is clamped between male and female dies to form a molded product, and a slide core provided in one of the dies is then fitted into a recess provided in the other die to make the undercut.

However, this conventional method is accompanied by the problem that the synthetic resin sheet is stretched during molding of the end and side walls and the undercut, thereby causing the embossed pattern to run and become indistinct, resulting in degraded commercial value.

In addition, the process of making the slide core and the recess into which the slide core is fitted is troublesome and therefore, the cost of the apparatus is increased, and the parting line between the slide core and the opening edge of the bore into which the slide core is slidably fitted may be disadvantageously transferred onto the embossed material.

SUMMARY OF THE INVENTION

It is therefore an object of the present invention to provide apparatus for manufacturing an article of synthetic resin wherein an embossing die is made by electrochemical molding and is formed with a multitude of fine pores which are utilized to apply suction force to a synthetic resin sheet heated to a softening temperature against the embossing die, whereby a complex embossing pattern such as possessed by a natural material can be imprinted onto the surface of the synthetic resin sheet.

It is another object of the present invention to provide apparatus for manufacturing an article of synthetic resin wherein after embossing the synthetic resin sheet, the latter is bonded to a core material, whereby an embossed material can be obtained free from running of the embossed pattern.

It is a further object of the present invention to provide apparatus for manufacturing a material of synthetic resin wherein the molding of an undercut is carried out using both blow and vacuum molding operations so that the parting line will not be transferred onto the surface of the embossed material.

It is yet a further object of the present invention to provide an apparatus for manufacturing a material of synthetic resin, which is so constituted that the molding of an undercut can be effected by using both a blow molding mechanism and a vacuum molding mechanism and which is thereby simple in construction and reduced in cost without the need for a slide core.

According to the present invention, the above objects are satisfied by providing a process for manufacturing an embossed article of synthetic resin, comprising the steps of: heating a synthetic resin sheet to a softening temperature; overlaying the synthetic resin sheet on an embossing die which has been made by an electrochemical molding process to have an embossing surface provided with an embossing pattern and a multitude of fine vacuum pores uniformly distributed over the entire embossing surface; and forcing the synthetic resin sheet against the embossing surface by applying a suction force through the fine vacuum pores to imprint the embossing pattern onto the surface of the synthetic resin sheet.

In addition, according to the present invention, a blowing pressure is applied to the embossed synthetic resin sheet through the fine vacuum pores to separate the embossed synthetic resin sheet from the embossing surface.

In further accordance with the invention, the synthetic resin sheet is pressed against the embossing die by a press die.

Moreover, according to the present invention, an adhesive is applied on one surface of a core material, the core material is placed on the press die with its adhesive surface facing outwardly and after the embossing pattern is imprinted on the resin sheet, a blowing pressure is applied to the resin sheet through the fine vacuum pores in the embossing die to release the resin sheet from the embossing surface and to press the resin sheet against the core material thereby adhesively bonding them together.

In further accordance with the invention, the press die and the core material are respectively provided with a plurality of vacuum holes, a vacuum suction force is applied through the vacuum holes in the press die and in the core material to assist in the release of the synthetic resin sheet from the embossing surface and its pressing against the core material.

Additionally, according to the present invention, the embossed article includes an end wall, side walls connected to the end wall, and an undercut connected to one of the side walls, the embossed pattern being on the end and side walls and leaving an unmolded portion, said unmolded portion being subjected to both blow and vacuum molding operations to shape the undercut.

In still further accordance with the present invention, there is provided an apparatus for manufacturing an embossed article of synthetic resin including an end wall, side walls connected t the end wall and an undercut connected to the side wall and having an embossed pattern at least on the end and side walls, said apparatus comprising an embossing die including an embossing pattern and a molding or shaping portion having a multitude of fine vacuum pores uniformly distributed over the entire embossing pattern and a blowing-pressure supply portion having a blow hole provided in a portion corresponding to the undercut and a press die including a clamping portion adapted to clamp the synthetic resin sheet between the clamping portion and the molding portion and an undercut shaping portion connected to the clamping portion for facing the blowing-pressure supply portion and having a plurality of vacuum pores.

As described above, the embossing die is made by an electro-chemical molding process to have an embossing surface on which the synthetic resin sheet is overlaid, and a multitude of fine vacuum pores uniformly distributed over the entire embossing surface. Therefore, the embossing die can be easily provided with embossing patterns of natural materials such as the skin pattern of cowhide, the grain of wood or the like, and the embossing pattern can be clearly imprinted on the synthetic resin sheet by forcing the highly heated synthetic resin sheet against the embossing surface of the embossing die by suction effect.

In addition, by applying the blowing pressure against the synthetic resin sheet through the vacuum pores ensures the release of the synthetic resin sheet from the embossing die. Since the synthetic resin sheet is pressed against the embossing die by the press die prior to the suction, a high degree of conformance of the synthetic resin sheet with the embossing surface of the embossing die is obtained thereby preventing the synthetic resin sheet from wrinkling during the application of the vacuum, thus enabling the embossing to be exactly and clearly imprinted on the synthetic resin sheet.

Since following the step of imprinting the embossing pattern, the core material is bonded to the synthetic resin sheet, an embossed article of synthetic resin can be obtained which is free from any running of the embossed pattern. Further, because the bonding between the synthetic resin sheet and the core material is carried out using a blowing pressure, both the operations can be reliably conducted.

Also, the use of both the blowing and vacuum pressures enables the release of the synthetic resin sheet from the embossing die and the pressing of the synthetic resin sheet against the core material to be conducted efficiently and with still greater reliability.

Moreover, since the end wall and the side walls connected thereto are formed on the sheet material and concurrently embossed, the embossed pattern can be formed distictly without running. Also, since the undercut is shaped using both blow and vacuum molding operations, no parting line is transferred onto the surface of the embossed article.

Still further, in the manufacturing apparatus as described above, because the conventional slide core is unnecessary in the formation of the undercut, the construction of the apparatus is simplified, thus making it possible to reduce its cost.

The above and other objects, features and advantages of the invention will become apparent from the following description taken in conjunction with the accompanying drawings.

BRIEF DESCRIPTION OF THE DRAWINGS

FIG. 9 is a vertical sectinal view of the apparatus in FIG. 8 illustrating the embossing the molding sequences.

FIG. 10 is a vertical sectional view of modified details of the apparatus according to a second embodiment of the present invention.

FIG. 11 is a vertical sectional view of modified details in the apparatus according to a third embodiment.

FIG. 12 is a vertical sectional view of modified details of the apparatus according to a fourth embodiment.

DESCRIPTION OF THE PREFERRED EMBODIMENT

Figure 1:
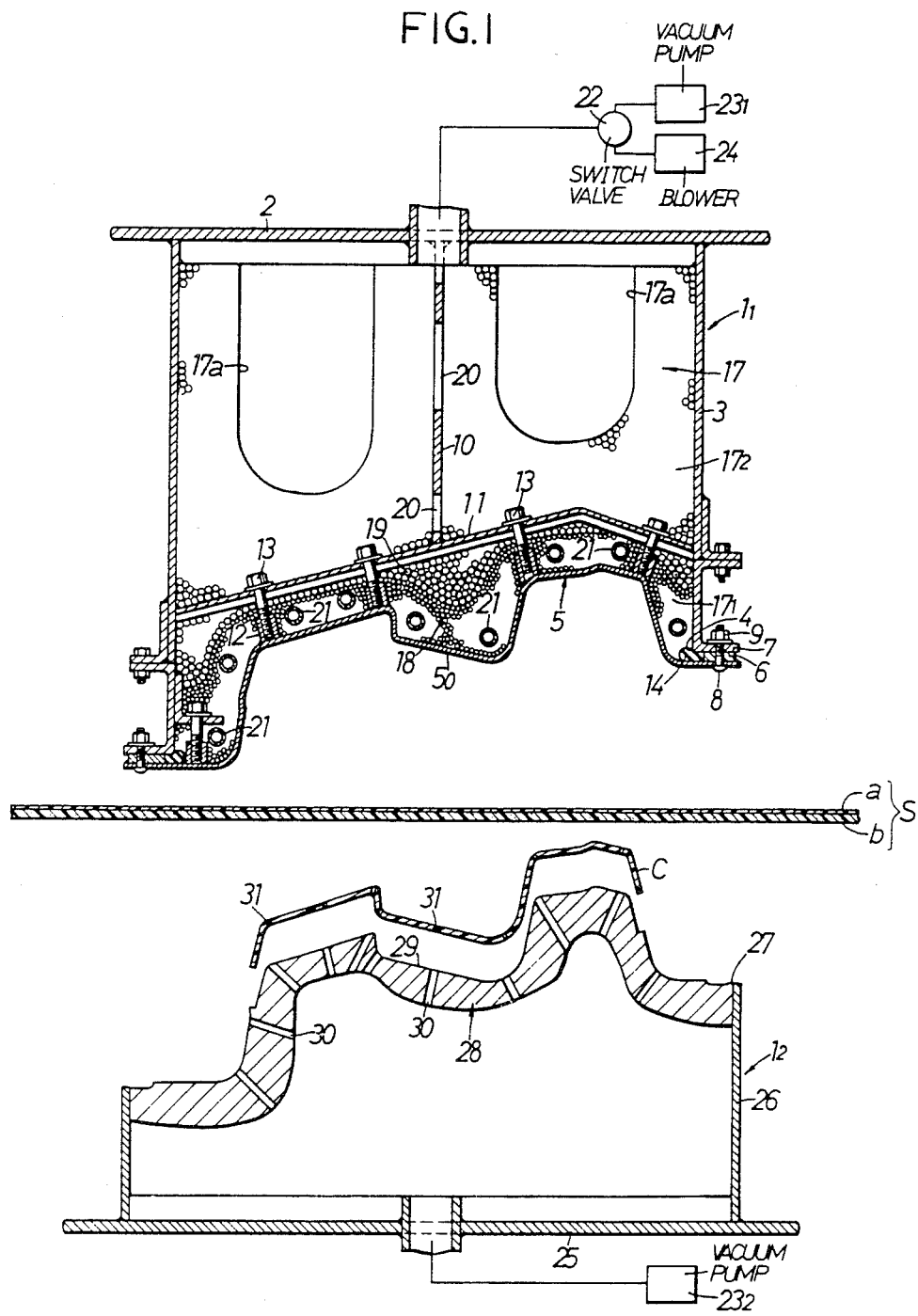
FIG. 1 is a sectional view of an apparatus according to one embodiment of the present invention.

Referring to FIG. 1, therein is shown a molding apparatus according to the invention for producing an embossed material of synthetic resin consisting of a synthetic resin sheet S and a core material C. The molding apparatus comprises a first vertically movable portion $1_1$ and a second vertically movable portion $1_2$ disposed below the first portion.

The first movable portion $1_1$ comprises a box-like body 3 including a top wall 2 and a downwardly directed opening 4 which is closed by an embossing die 5 having a configuration corresponding to that of the shape of the article to be molded. An outer peripheral edge of the embossing die 5 is secured through a filler plate 6 to a flange 7 of the box-like body 3 by a plurality of bolts 8 and nuts 9. A support plate 10 is suspended from the top wall 2 of the box-like body 3 and has a lower edge to which a plurality of angle members 11 are welded, at intermediate portions thereof, at predetermined spacing in a plane perpendicular to FIG. 1. Each angle member 11 is also welded at its opposite ends to the inner surfaces of the side wall of the box-like body 3. The embossing die 5 is supported in a suspended manner on the individual angle members 11 by a plurality of bolts 13 screwed through the angle members 11 into threaded tubes 12 integrally attached at the rear surface of the embossing die 13. A vacuum sealing member 14 is interposed between the inner surface of the flange 7 and the embossing die 5.

Figure 2:
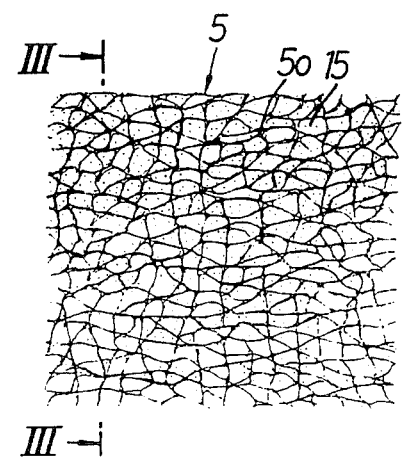
FIG. 2 is a plan view in part of an embossing die.
Figure 3:
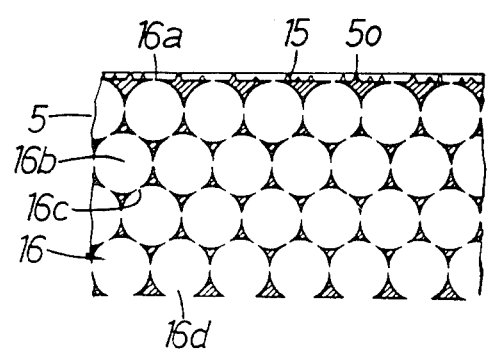
FIG. 3 is a sectional view, on enlarged scale, taken along line III—III in FIG. 2.

Referring to FIGS. 2 and 3, the embossing die 5 is made in an electro-chemical electrocasting process of a molded material such as nickel and has an embossing pattern 15 simulating cowhide formed on its casting surface $5_0$ which is intended to contact the article to be formed. The embossing die 5 also has a multitude of fine vacuum pores 16 therein uniformly distributed throughout its extent to form a microporous body. At the casting surface $5_0$, the pores 16 have openings 16a arranged longitudinally and laterally at a pitch of about 0.2 mm and each has a diameter of 0.03 to 0.05 mm. Because the openings 16a of the fine vacuum pores 16 have an extremely small diameter, they do not affect the embossing pattern 15.

The embossing die 5 is produced by making a precision model from cowhide, forming an electrically conductive layer on the cowhide pattern surface of the precision model, laminating four layers of polystyrene beads having a diameter of 0.2 mm on the surface of the conductive layer and overlaying thereon a floatation preventing material consisting of glass beads contained in a net, whereafter, the resulting precision model is placed in a plating bath where it is subjected to an electro-chemical molding process to form a plated layer of a plating material such as nickel to a thickness such that the upper peripheral surface of the polystyrene beads in the uppermost layer is exposed, while the space between adjacent polystyrene beads is filled with nickel. The polystyrene beads are then removed from the electro-chemically molded nickel material by melting.

The melting of the polystyrene beads results in the formation of openings 16a at the contact points between the polystyrene beads in the lowermost layer and the conductive layer on the precision model, cavities 16b of a size corresponding to that of the polystyrene beads formed in the nickel material, openings 16c establishing communication between adjacent cavities 16b at the contact points between adjacent polystyrene beads, and openings 16d at the location of the upper surface of the polystyrene beads in the uppermost layer whereby the die is a microporous body having pores 16 which communicate with one another and have openings at the front casting surface $5_0$ and at the rear surface.

A porous back-up body 17 is integrally bonded to the rear surface of the embossing die 5 within the box-like body 3 to reinforce the embossing die 5. The back-up body 17 consists of a first layer $17_1$ disposed on the embossing die 5 and a second layer $17_2$ laminated on the first layer $17_1$. The first layer $17_1$ is formed by a multitude of steel balls having excellent corrosion resistance such as stainless steel in which the adjacent steel balls are partially bonded together at contact points by a thermosetting synthetic resin such as an epoxy resin, and the second layer $17_2$ is of a multitude of glass beads, in which the adjacent glass beads are partially bonded together at contact points with a similar thermosetting synthetic resin.

Figure 4:
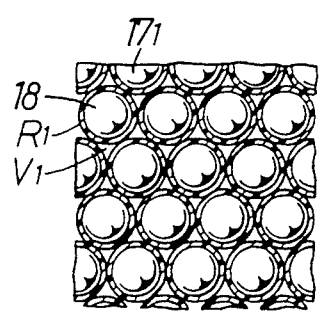
FIG. 4 is a sectional view of part of a first layer in a back-up body of the apparatus.

The first layer $17_1$ is formed by pouring, into the box-like body 3 at the rear of the embossing die 5, a predetermined amount of steel balls 18 of 70 to 150 $\mu$ diameter having, as shown in FIG. 4, a thin resinous layer R1 of the thermosetting synthetic resin and then heating the steel balls 18 and the resinous layer R1 to a temperature of 70° to 80° C. to bond the resinous layers R1 at the contact points between the respective adjacent steel balls 18 and form cavities $V_2$ surrounded by the respective bonded points. During such bonding of the adjacent steel balls 18, the first layer $17_1$ is also bonded to the embossing die 5 by the resinous layer R1.

Figure 5:
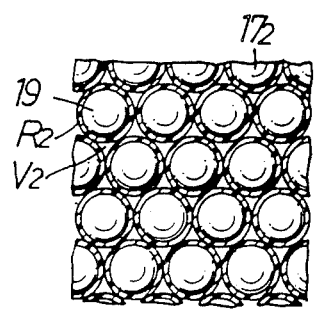
FIG. 5 is a sectional view of a part of a second layer in the back-up body.

The second layer $17_2$ is formed after suspending members (not shown) in the box-like body 3 which are to form recesses 17a for weight reducing purposes. The suspended members have a cross-section conforming to the shape of the recesses 17a. Thereafter, a predetermined amount of glass beads 19 of 400 to 600 $\mu$ diameter having on their surfaces, as shown in FIG. 5, a thin resinous layer R2 of the thermosetting synthetic resin are poured into the box-like body 3 onto first layer $17_1$. The glass beads 19 and their resinous layers R2 are then heated to a temperature of 70° to 80° C. to bond the resinous layers R2 at the contact points between the respective adjacent glass beads 19 and form cavities $V_2$ surrounded by the respective bonded points. The cavities $V_2$ define continous pores in the second layer $17_2$. During such bonding of the respective adjacent glass beads 19, the second layer $17_2$ is also bonded to the first layer $17_1$ by the resinous layers $R_2$.

The support plate 10 has a plurality of through holes 20 therein, so that during the pouring of the glass beads 19, the flow of the glass beads will not become obstructed.

Cooling pipes 21 are embedded in the first layer 17, to extend in a zigzag line for cooling the embossing die 5 over its entire extent. In this case, the first layer $17_1$ has good heat conductivity as it consists essentially of the steel balls 18, and therefore, the embossing die 5 can be efficiently cooled. In addition, the provision of the cooling pipes 21 embedded in zigzag manner serves to reinforce the first layer $17_1$.

The box-like body 3 is connected through a switch valve 22 to a vacuum pump $23_1$ and a blower 24.

The second movable portion $1_2$ comprises a press die 28, having a configuration corresponding to the embossing die 5, secured to a box-like body 26 to cover an upwardly directed opening $27_3$ of the box-like body. The box-like body 26 has a bottom wall 25. The press die 28 has a recess 29 defined therein into which core material C is fitted. The die 28 has a plurality of vacuum holes 30 therein extending therethrough and distributed substantially uniformly over the entire extent thereof. The box-like body 26 is internally connected to a vacuum pump $23_2$.

The synthetic resin sheet S which may be used in the apparatus comprises a single sheet of polyvinyl chloride or the like, or a laminate consisting of a layer of the polyvinyl chloride surface or skin layer and a sheet of polypropylene foam adhered to the skin layer as a cushion backing layer.

The core material C comprises a plate of ABS resin or the like provided with a plurality of small diameter vacuum holes 31, the plate being molded to a shape to mate with the recess 29 in the press die 28.

The production of an embossed material of synthetic resin will now be described.

A hot melt adhesive is applied onto the surface of the core material C and then heated to a softening temperature.

The first movable portion $1_1$ is raised as shown in FIG. 1 and the second movable portion $1_2$ is lowered to open the embossing die 5 and the press die 28. The core material C is fitted in the recess 29 of the press die 28 with its adhesive surface facing upwardly and with its vacuum holes 31 aligned with the vacuum holes 30 in the press die 28.

A synthetic resin sheet S consisting of skin layer a and cushion layer b is heated to a relatively high temperature of approximately 180° C. to soften the sheet and the sheet is placed between the first and second movable portions $1_1$ and $1_2$ with its skin layer a facing upwardly.

Figure 6:
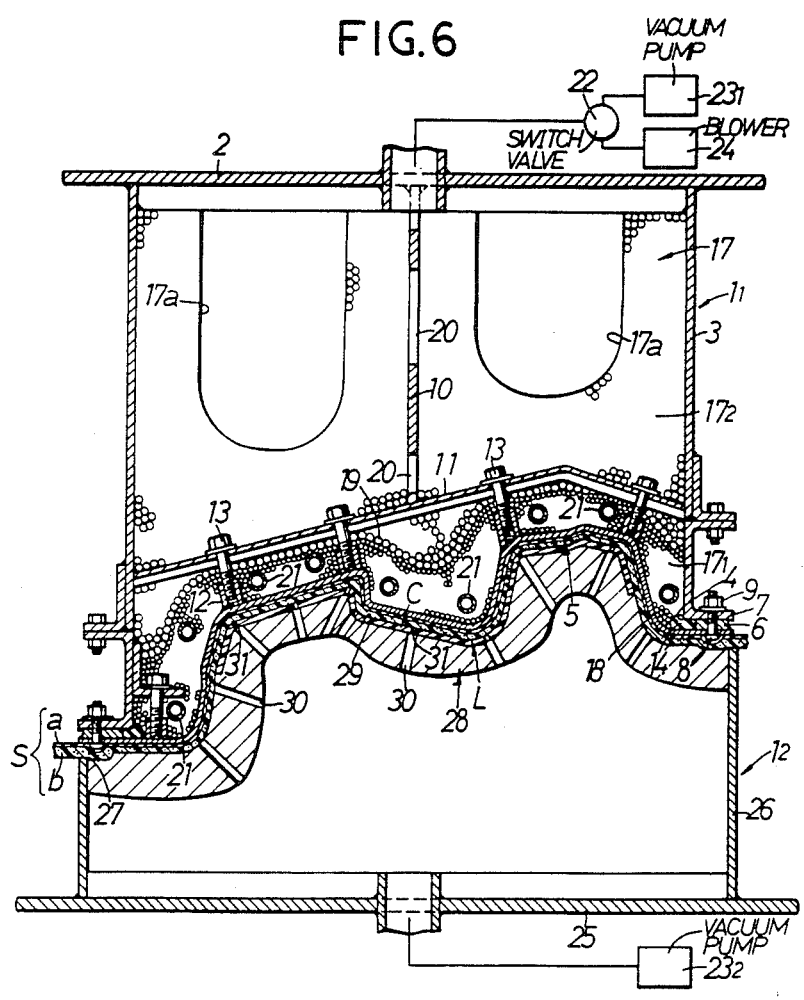
FIG. 6 is a vertical sectional view of the apparatus illustrating the embossing and molding sequences.

As shown in FIG. 6, the first movable portion $1_1$ is moved downwardly and the second movable portion $1_2$ is moved upwardly to clamp the synthetic resin sheet S between the embossing die 5 and the press die 28. In this arrangement, because the synthetic resin sheet S is pressed against the casting surface $5_0$ of the embossing die 5 by the press die 28, its conformance with the surface $5_0$ is assured.

The box-like body 3 of the first movable portion $1_1$ is internally connected to the vacuum pump $23_1$ through the switch valve 22, and the vacuum pump $23_1$ subjects the synthetic resin sheet S to a suction force. In this case, since the embossing die 5 is a microporous body with the fine vacuum pores 16 distributed throughout and the synthetic resin sheet S is in conformance with the casting surface $5_0$ by the press die 28, the sheet S is strongly forced against the entire casting surface $5_0$, whereby an embossed pattern 15 is exactly and clearly imprinted or embossed onto the sheet S while at the same time, the sheet S is formed with the same configuration as the embossing die 5. Since the embossing die 5 is cooled by the cooling pipes 21, the sheet S is immediately cooled so that the embossed pattern 15 and the configuration of the sheet is fixed and prevented from being destroyed.

Thereafter, the vacuum pump $23_2$ of the second movable portion $1_2$ is operated to suction the molded product against the press die 28 and the surface of the core material C, while the box-like body 3 of the first movable portion $1_1$ is internally connected to the blower 24 by switching over the switch valve 22 to apply a blowing pressure to the molded product.

This causes the product to be released from die 5 and to be forced against the integrally bonded to the core material C. Since the molded product has been strongly forced against the embossing die 5, the use of both the vacuum and blowing pressures is extremely effective for promoting the release of the molded product.

Thereafter, the blower 24 is stopped, and the box-like body 26 of the second movable portion $1_2$ returns to ambient atmospheric pressure. The first movable portion $1_1$ is then moved upwardly and the second movable portion $1_2$ is moved downwardly and the resulting embossed material of synthetic resin L is removed from the press die 28.

The embossed pattern 15 corresponding to the skin pattern of the cowhide is accurately formed on the surface of the embossed material L without any running of the embossing pattern 15, and the molded product of the synthetic resin sheet S is bonded to the core material C with great strength, leading to excellent durability. Such embossed materials L are suitable for instrument panels, internal finish materials or the like for automobiles.

The above manufacturing process is, of course, also applicable to the embossing of the synthetic resin sheet S by a flat embossing die without the press die 28 or with a press die adapted to mate with the embossing die and employing blowing pressure for release after the embossing operation. In the case of using a flat embossing die, the recess 29, into which the core material C is fitted, is not required in the press die.

Figure 7:
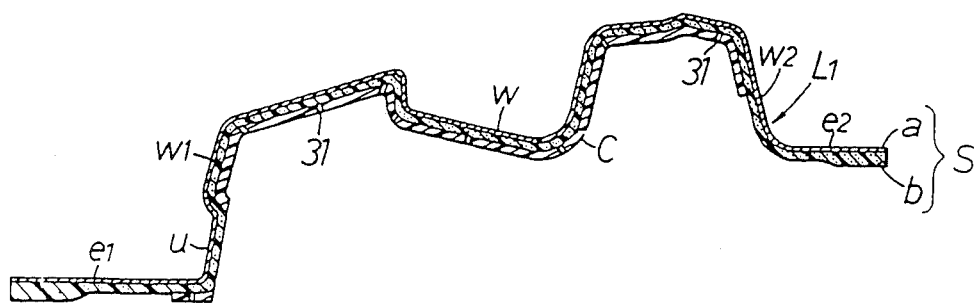
FIG. 7 is a vertical sectional view of the molded article.

Referring to FIG. 7, therein is shown an embossed article of synthetic resin L1 composed of a synthetic resin sheet S and a core material C and having an undercut. The embossed article L1 includes an end wall W, a pair of side walls W1 and W2 respectively connected to the opposite ends of the end wall W, a shallow undercut u connected to one of the side walls W1, and a pair of edges e1 and e2 one of which is connected to the undercut u, the other being connected to the other side wall W2. An embossed pattern is formed on the surface of the synthetic resin sheet at the end wall W and the side walls W1 and W2.

Figure 8:
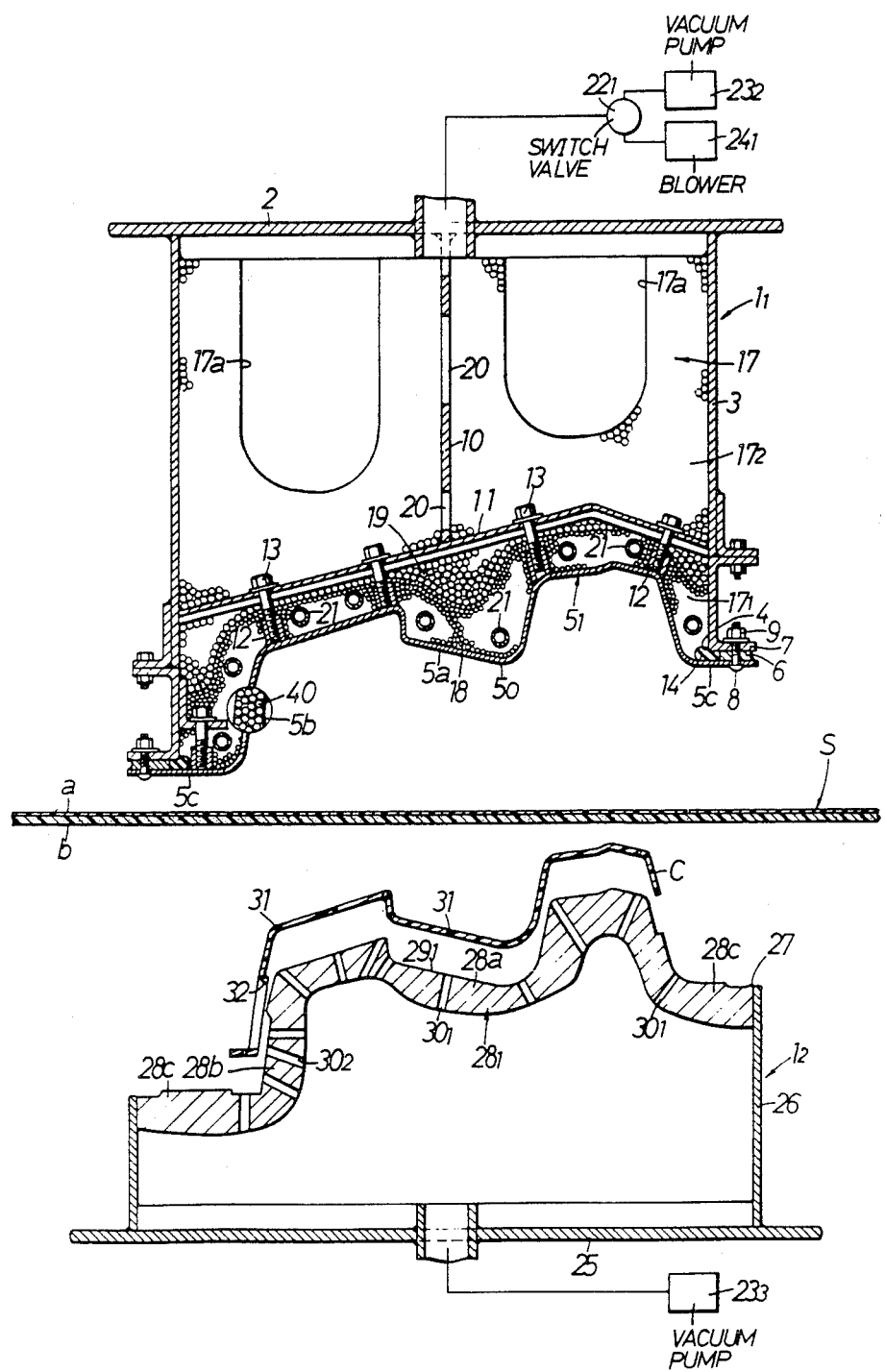
FIG. 8 is a vertical sectional view of the embodiment of the apparatus of the present invention in open position in readiness for manufacturing the article in FIG. 7.

FIG. 8 illustrates apparatus for manufacturing the embossed article L1 of FIG. 7 according to a first embodiment of the present invention. This apparatus is basically the same as the apparatus shown in FIG. 1 and therefore it will be described only in respect of parts different in construction from the apparatus shown in FIG. 1.

As shown in FIG. 8, embossing die $5_1$ comprises a shaping or forming portion 5a for shaping the end wall W and both the side walls W1 and W2 of the article L1, a blowing-pressure supply portion 5a having blow holes 40 provided at a location corresponding to the undercut u, and sheet stopper portions 5c respectively connected to the blowing-pressure supply portion 5a and to the shaping portion 5a remote from the blowing-pressure supply portion 5b. The blow holes 40 are formed during the electro-chemical molding process and are constituted of a multitude of fine air-passage pores in the same manner as the fine vacuum pores 16 in the shaping portion 5a.

Press die $28_1$ comprises a clamping portion 28a adapted to clamp synthetic resin sheet S and core material C in cooperation with the shaping portion 5a of embossing die $5_1$, an undercut shaping portion 28b connected to one end of the clamping portion 28a for opposing supply portion 5b, and sheet stopper portions 28c one of which is connected to the undercut shaping portion 28b, the other being connected to the other end of the clamping portion 28a.

The clamping portion 28a and the undercut shaping portion 28b have a plurality of vacuum holes $30_1$ and $30_2$ distributed substantially uniformly over the extent thereof. On the upper surface of the press die 28 is a recess $29_1$ into which the core material C is fitted. The recess $29_1$ extends over the entire region of the clamping portion 28a from that portion of sheet stopper portion 28c in the vicinity of the undercut shaping portion 28b.

The core material C is molded to mate with the recess $29_1$ of the press die $28_1$ and has a window corresponding to the undercut shaping portion 28b.

In FIG. 8, reference character $22_1$ designates a switch valve, reference characters $23_2$ and $23_3$ denote respective vacuum pumps and reference character $24_1$ denotes a blower. The other elements are the same as those in the apparatus shown in FIG. 1.

The molding of the article L1 takes place as follows.

A hot melt adhesive is applied onto the surface of core material C and is heated to a softening temperature.

As shown in FIG. 8, the first movable portion $1_1$ is moved upwardly and the second movable portion $1_2$ is moved downwardly to open the embossing die $5_1$ and press die $28_1$. The core material C is fitted in the recess $29_1$ of the press die $28_1$ with its adhesive surface facing upwardly such that the individual vacuum holes 32 therein are aligned with the individual vacuum holes $30_1$ in the press die $28_1$ and the window 32 is aligned with the undercut shaping portion 28b, respectively.

Synthetic resin sheet S consisting of the skin layer a of polyvinyl chloride and a cushion layer b of polypropylene foam sheet is heated to a softening temperature. The resulting synthetic resin sheet S is placed between the first and second movable portions $1_1$ and $1_2$ with its skin layer a facing upwardly.

As shown in FIG. 9, the first movable portion $1_1$ is moved downwardly and the second movable portion $1_2$ is moved upwardly to clamp the synthetic resin sheet S between the shaping portion 5a of the embossing die $5_1$ and the clamp portion 28a of the press die $28_1$ and between the respective sheet stopper portions 5c and 28c of both the dies $5_1$ and $28_1$.

The box-like body 3 of the first movable portion $1_1$ is internally connected through the switch valve $22_1$ to the vacuum pump $23_2$ to subject the synthetic resin sheet S to a suction force. In this case, because the shaping portion 5a has the fine vacuum pores 16 distributed therethroughout and the synthetic resin sheet S conforms to the shaping portion 5a by the clamp portion 28a, the sheet S is strongly forced against the entire shaping portion 5a, whereby pattern 15 is exactly and clearly imprinted or embossed on the surface of the sheet S, while at the same time, the sheet S is molded to the same configuration as the shaping portion 5a. Because the first shaping portion $5_1$ is cooled by the cooling pipes 21, the surface of the sheet S is immediately cooled thereby ensuring that the embossed pattern is clearly maintained. In this case, that portion of the synthetic resin sheet S, opposite the undercut shaping portion 28b is also suctioned against the blowing-pressure supply portion 5a of the embossing die $5_1$; the embossing pattern 15 is also imprinted on such portion.

The box-like body 3 of the first movable portion $1_1$ is connected to the blower $24_1$, by switching over the switch valve $22_1$ to apply blowing pressure to the molded product which has an end wall W and opposite side walls W1 and W2, while vacuum pump $23_2$ of the second movable portion $1_2$ is activated to force the semi-molded product against the press die $28_1$ by a suction force.

This causes the molded product to be released from the embossing die $5_1$ and to be forced against and integrally bonded to the core material C.

In addition, the use of both the blowing pressure at the blowing-pressure supply portion 5a and the vacuum pressure at the undercut shaping portion 28b allows the unmolded portion of the synthetic resin sheet S connected to the side wall W1 opposite the undercut shaping portion 28b to be forced against the undercut shaping portion 28b, whereby undercut u is formed.

The blower $24_1$ is then stopped, and the box-like body 26 of the second movable portion $1_2$ returned to the ambient pressure of the atmosphere. Thereafter, the first movable portion $1_1$ is moved upwardly and the second movable portion $1_2$ is moved downwardly and the resulting article L1 is removed from the press die 28. That portion of the article L1 opposite the window 32 of the core material C is cut away.

The pattern 15, identical to the skin pattern of cowhide, is clearly transferred onto the surfaces of the end wall W the opposite side walls W1 and W2 and the undercut u of the article L1 without running. In addition, the cushion layer b is bonded to the core material C with great strength, thus providing excellent durability. Moreover, since the undercut u is shaped by the use of both blow molding and vacuum molding operations, it has a good surface property. The articles L1 are also suitable for instrument panels, inner finish materials or the like for automobiles as are the previous described articles L.

FIGS. 10 to 12 illustrate apparatus according to second to fourth embodiments of the present invention, respectively. In these embodiments, the undercut shaping portion 28b of the press die $28_1$ is more deeply formed, and various means are provided for corresponding increase of the blowing pressure.

In the second embodiment in FIG. 10, the inner surface of the box-like body 3 of the first movable portion $1_1$ and a partition wall 33 provided within the box-like body 3 define an air chamber 34 which is located behind the blowing-pressure supply portion 5b to surround the blow holes 40, and a vacuum pump $23_4$ and a blower $24_2$ are connected through a switch valve $22_2$ to the air chamber 34. The other structure is the same as in the first embodiment.

The third embodiment in FIG. 11 is a modification of the second embodiment. In the third embodiment, each blow hole 40 is made larger in diameter, and each air passage pore is also made larger using larger diameter steel balls in the back-up body 17 within the air chamber 34. Each blow hole 40 is made larger in diameter in the electro-chemical molding process.

In the fourth embodiment in FIG. 12, an air pipe 35 having blow holes 40a is provided behind the blowing-pressure supply portion 5b, and the vacuum pump $23_4$ and the blower $24_2$ are connected through the switch valve $22_2$ to the air passage pipe 35, to supply blowing-pressure to the undercut shaping portion in the same manner as described above.

It is to be understood that the present invention is also applicable to an embodiment in which the article L1 is embossed at its end wall W and only one of its side walls W1 or W2.

While the invention has been disclosed in relation to preferred embodiments thereof, it will become apparent to those skilled in the art that numerous modifications and variations can be made within the scope and spirit of the invention as defined in the claims.

What is claimed is:

1. An apparatus for manufacturing an embossed article of synthetic resin from a synthetic resin sheet, the embossed article having an end wall, side walls connected to the end wall, an undercut portion connected to one of said side walls, and an embossed pattern on at least one said end and side walls, said apparatus comprising:

an embossing die including a molding or shaping portion having an embossing pattern and a multitude of fine vacuum pores distributed uniformly over the entire extent of said embossing pattern to shape or mold the end wall and side walls of the article while concurrently embossing said walls, said die further including a blowing-pressure supply portion having blow holes in a region corresponding to the undercut portion of the article; and a press die including a clamping portion for clamping the synthetic resin sheet in cooperation with said molding or shaping portion and an undercut shaping portion connected to said clamping portion for coming into opposition to said blowing-pressure supply portion when the embossing die and press die clamp the sheet, said undercut shaping portion having a plurality of vacuum holes therein.

2. An apparatus for manufacturing an embossed article of synthetic resin having an undercut as claimed in claim 1 wherein said blow holes of said blowing-pressure supply portion in said embossing die are constituted by a multitude of fine air passage holes corresponding to said fine vacuum pores in said molding or shaping portion.

3. An apparatus for manufacturing an embossed article of synthetic resin having an undercut as claimed in claim 1 wherein said blow holes of said blowing-pressure supply portion in sai embossing die are constituted by a plurality of fine air passage holes having a diameter larger than that of said fine vacuum pores.

4. An apparatus for manufacturing an embossed article of synthetic resin having an undercut as claimed in claim 1 wherein the blowing-pressure supply portion in said embossing die includes an air chamber surrounding said blow holes therebehind.

5. An apparatus for manufacturing an embossed article of synthetic resin having an undercut as claimed in claim 4 wherein said embossing die includes a reinforcing back-up body having air passage holes therebehind, said air passage holes in said back-up body located in said air chamber being larger than the other of said air passage holes.

6. An apparatus for manufacturing an embossed article of synthetic resin having an undercut according to claim 1 wherein the blowing-pressure supply portion in said embossing die includes an air passage pipe having said blow holes therebehind.

7. An apparatus for manufacturing an embossed article of synthetic resin having an undercut as claimed in claim 1, further including a vacuum pump, a blower and a switch valve connecting said pump and blower selectively to said embossing die.

8. An apparatus for manufacturing an embossed article of synthetic resin having an undercut as claimed in claim 1 wherein said press die has a recess adapted to receive a core material to which said synthetic resin sheet is bonded, said core material having vacuum holes therein, said press die having a plurality of vacuum holes capable of being aligned with the vacuum holes in said core material; and further including a vacuum pump connected to said press die for communicating with said vacuum holes therein.

9. An apparatus for manufacturing an embossed article of synthetic resin from a synthetic resin sheet, said apparatus comprising:
an embossing die having a surface with an embossing pattern and a multitude of fine vacuum pores distributed uniformly over the extent of said embossing pattern; and
a press die for clamping a synthetic resin sheet between said embossing die and said press die,
said embossing die including a molding or shaping portion having said embossing pattern and multitude of fine vacuum pores to shape or mold the article while concurrently embossing the same,
said press die including a clamping portion for clamping the synthetic resin sheet in cooperation with said molding or shaping portion,
said molding or shaping portion comprising an electrocast shell including a microporous body having a front casting surface with a grain pattern thereon, said microporous body having said multitude of fine vacuum holes uniformly distributed at said front casting surface, and
a back-up body on the rear surface of the microporous body, said back-up body comprising a multitude of adjoining small particles in contact with one another at contact points thereof, said particles being connected to one another at said contact points and providing vent spaces between said particles, said vent spaces being in communication with said fine vacuum holes in said microporous body, said back-up body comprising a first layer on said electrocast shell and a second layer laminated on said first layer, said particles in said first layer including a multitude of adjoining steel balls connected at contact points by a thermosetting plastic, said particles in said second layer including a multitude of adjoining glass particles connected at contact points by the thermosetting plastic.

10. An apparatus for manufacturing an embossed article of synthetic resin from a synthetic resin sheet as claimed in claim 9, further including a vacuum pump, a blower and a switch valve connecting said pump and blower selectively to said embossing die.

11. An apparatus for manufacturing an embossed article of synthetic resin from a synthetic resin sheet as claimed in claim 9 wherein said press die has a recess adapted to receive a core material to which said synthetic resin sheet is bonded, said core material having vacuum holes therein, said press die having a plurality of vacuum holes capable of being aligned with the vacuum holes in said core material; and further including a vacuum pump connected to said press die for communicating with said vacuum holes therein.

* * * * *